United States Patent
Shi

(10) Patent No.: US 8,705,409 B2
(45) Date of Patent: Apr. 22, 2014

(54) WAVELENGTH DIVISION MULTIPLEXING NETWORK PATH SEARCH METHOD AND SYSTEM

(75) Inventor: Lili Shi, Shenzhen (CN)

(73) Assignee: ZTE Corporation, Shenzhen (CN)

(*) Notice: Subject to any disclaimer, the term of this patent is extended or adjusted under 35 U.S.C. 154(b) by 110 days.

(21) Appl. No.: 13/258,562

(22) PCT Filed: Aug. 26, 2009

(86) PCT No.: PCT/CN2009/073546
§ 371 (c)(1),
(2), (4) Date: Dec. 2, 2011

(87) PCT Pub. No.: WO2010/139139
PCT Pub. Date: Dec. 9, 2010

(65) Prior Publication Data
US 2012/0093033 A1    Apr. 19, 2012

(30) Foreign Application Priority Data
Jun. 5, 2009 (CN) .......................... 2009 1 0108024

(51) Int. Cl.
H04L 12/28 (2006.01)
(52) U.S. Cl.
USPC .......................................... 370/255; 370/400
(58) Field of Classification Search
None
See application file for complete search history.

(56) References Cited

U.S. PATENT DOCUMENTS

| | | | |
|---|---|---|---|
| 2003/0020977 A1* | 1/2003 | Smith et al. ................... | 359/110 |
| 2005/0201380 A1* | 9/2005 | Saleh et al. ................. | 370/395.2 |
| 2009/0034538 A1* | 2/2009 | Sato .............................. | 370/400 |
| 2009/0213759 A1* | 8/2009 | Kitajima ...................... | 370/254 |

FOREIGN PATENT DOCUMENTS

| | | | |
|---|---|---|---|
| CN | 101192883 A | 4/2003 | |
| CN | 1983953 A | 6/2007 | |
| CN | 101060420 A | 10/2007 | |
| CN | 101145884 A | 3/2008 | |
| CN | 101179419 A | 5/2008 | |
| EP | 1993223 A1 | 11/2008 | |
| JP | 2003023447 A | 1/2003 | |
| JP | 2003234771 A | 8/2003 | |
| JP | 2008054233 A | 3/2008 | |
| JP | 2008244689 A | 10/2008 | |

OTHER PUBLICATIONS

International Search Report in international application No. PCT/CN2009/073546, mailed on Mar. 25, 2010.
English Translation of the Written Opinion of the International Search Authority in international application No. PCT/CN2009/073546, mailed on Mar. 25, 2010.

* cited by examiner

*Primary Examiner* — David Oveissi
(74) *Attorney, Agent, or Firm* — Oppedahl Patent Law Firm LLC

(57) ABSTRACT

The present invention discloses a wavelength division multiplexing (WDM) network path search method and system. The method includes: step A, searching out a network element linked list from a source network element of a service to a destination network element according to a inter-network element connection; step B, performing a port search on the network element linked list, performing a validity check on a found node, and ending the search when an invalid node is found; and step C, sorting out a path linked list of all possible paths according to path topology structure data searched out. The searching efficiency is improved by the present invention.

16 Claims, 4 Drawing Sheets

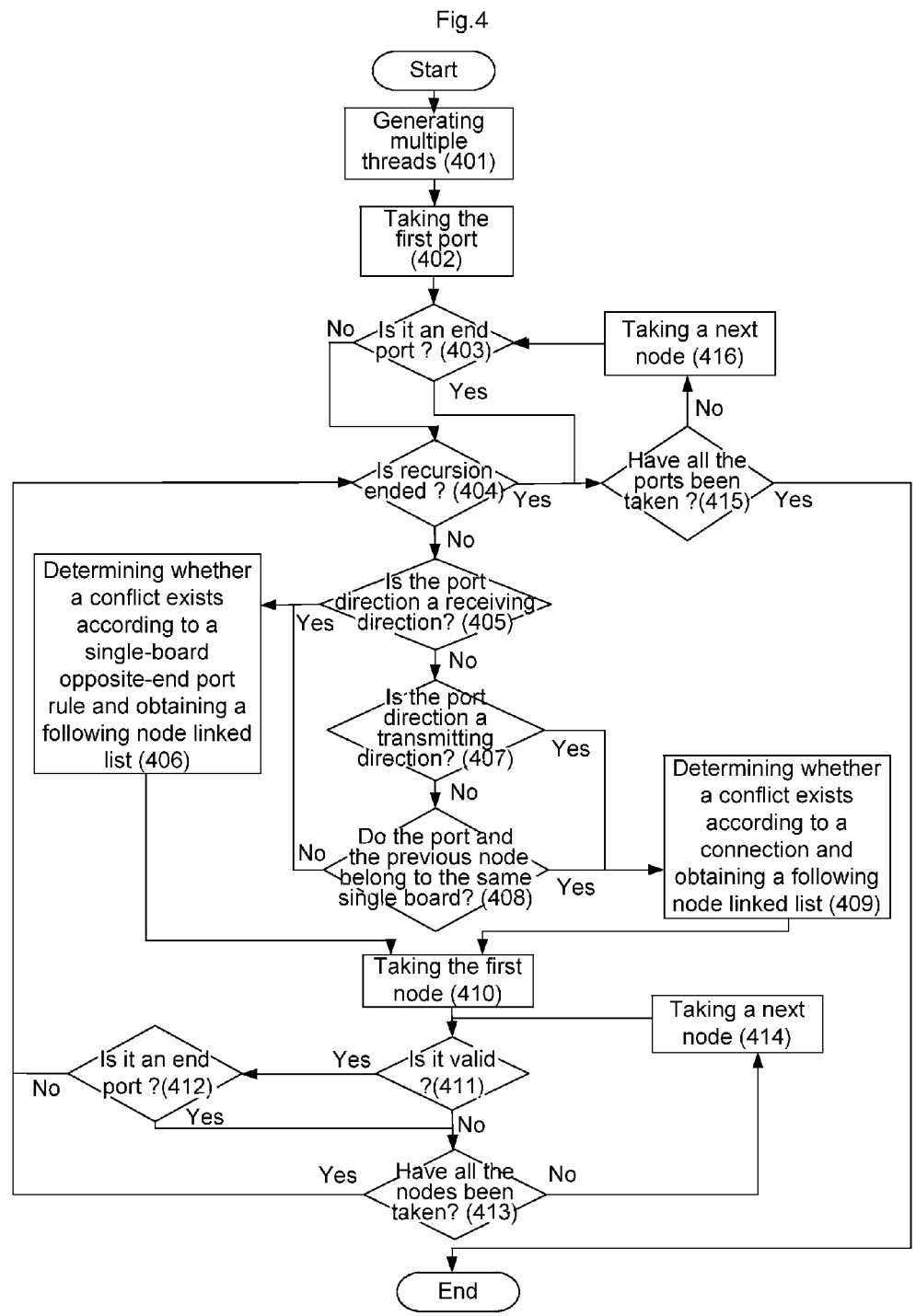

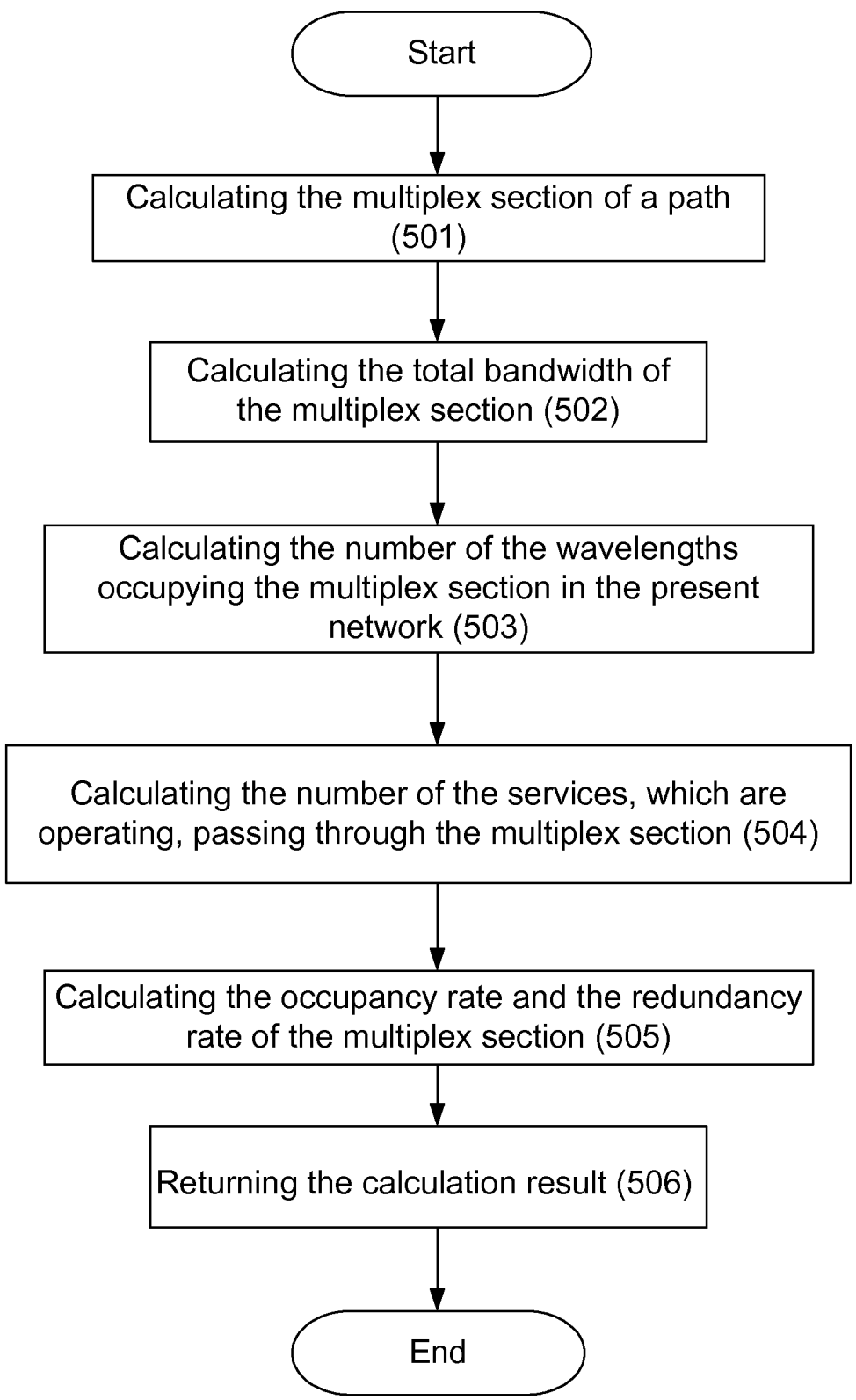

WAVELENGTH DIVISION MULTIPLEXING NETWORK PATH SEARCH METHOD AND SYSTEM

TECHNICAL FIELD

The present invention relates to the field of optical communications, and in particular to a Wavelength Division Multiplexing (WDM) network path search method and a WDM network path search system.

BACKGROUND

With the development of high-speed transmission networks, optical communication becomes a trend. The WDM technology combines signal carriers with different regulated wavelengths by using a combiner at a transmitting end and then transmits the combined signal carriers through an optical fiber; a wave splitter splits apart the optical carriers of different signals at a receiving side. In order to bear a service, it is necessary for a wavelength division network management system to search out available paths first according to equipment resources and optical fiber connections thereof or cross connections thereof. The equipment resources refer to various single boards for accomplishing various functions during a carrier transmission process and various wavelength division network elements on which these single boards are located. The optical connections are divided into an intra-network element connection and an inter-network element connection; the intra-network element connection is a connection between different single boards located on one network element; the inter-network element connection is a connection between different single boards located on different network elements. The cross connection particularly refers to a cross relationship configured between backboard ports respectively belonging to two cross single boards. A light passing direction is pre-designed inside each type of single board, that is, the light which enters from a certain port will get out from a/some specific ports based on a rule; the rule which is abstracted out based on the designs of the single boards is generally called an opposite-end port rule. Specific connection rules also exist between various types of single boards, that is, the types of two given single boards determine which output port is to be used by the former single board and which input port is to be used by the latter single board when an optical connection is established.

The network management system can search out multiple paths for a service according to the opposite-end port rule of the single board after establishing an optical connection based on an inter-board connection rule. Since the connection rules of all single boards are different and some rules are very complex, a false connection will be easily established if full attention is not paid, then the path searched out is wrong and a carrier cannot send the service to a destination along this wrong path.

SUMMARY

The technical problem to be solved in the present invention is to provide a WDM path search method for determining the validity of a node efficiently and comprehensively and an implementing system based on the method.

To solve the above technical problem, the present invention provides the following technical solutions:

In one aspect, a WDM network path search method is provided, which comprises the following steps:

A. searching out a network element linked list from a source network element of a service to a destination network element according to an inter-network element connection;

B. performing a port search on the network element linked list, performing a validity check on a found node, and ending the search when an invalid node is found; and C. sorting out a path linked list of all possible paths according to path topology structure data searched out.

In the step B, the validity check on the found node may be performed by checking whether each item of a wavelength, a wave band, a work/protection attribute, a branch-path number, a time slot and a service type is matched.

The step B may further comprise performing a conflict check between the found node and an established path, and ending the search when the found node having a conflict with the established path is found.

The step A may further comprise dividing the network element linked list into a plurality of sub-segments according to a preset rule; and the step B may further comprise a process of performing the port search on the plurality of sub-segments respectively.

In the step B, the port search on the plurality of sub-segments respectively may be performed by generating a search thread for each sub-segment respectively and performing the port search on search threads of all sub-segments in parallel.

After step C, the method may further comprise calculating historical interruption times of all connections on each path of all the possible paths obtained in the step C and returning a calculation result.

After step C, the method may further comprise calculating a resource occupancy rate of a multiplex section on each path of all the possible paths obtained in the step C and returning a calculation result.

In another aspect, a WDM network path search system is provided, which comprises a first search module, a second search module and a path generation module.

The first search module is configured to search out a network element linked list from a source network element of a service to a destination network element according to inter-network element connections;

the second search module is configured to perform a port search on the network element linked list, perform a validity check on a found node, and end the search when an invalid node is found; and the path generation module is configured to sort out a path linked list of all possible paths according to path topology structure data searched out.

The validity check on a found node may comprise checking whether each item of a wavelength, a wave band, a work/protection attribute, a branch-path number, a time slot and a service type is matched.

The second search module may be further configured to perform a conflict check between the found node and an established path, and end the search when the found node having a conflict with the established path is found.

The first search module may comprise a sub-segment dividing unit configured to divide the network element linked list into a plurality of sub-segments according to a preset rule; and the second search module may comprise a sub-segment search unit configured to perform the port search on the plurality of sub-segments respectively.

The sub-segment search unit may be further configured to generate a search thread for each sub-segment respectively and perform the port search on search threads of all sub-segments in parallel.

Compared with the related art, the present invention has the following beneficial effects:

(1) the invention first searches out a network element linked list, performs a port search on the network linked list, performs a validity check on a node and ends the search when an invalid node is found; on the basis of fully determining the validity of a node, the search efficiency is improved;

(2) in the invention, the validity check on a node comprises checking whether each item of a wavelength, a wave band, a work/protection attribute, a branch-path number, a time slot and a service type is matched; therefore, the problem of incomplete validity check in the related art is solved and the accuracy of the path search is improved;

(3) the invention also performs a conflict check between the node and an established path; therefore, the accuracy and the reasonability are improved, the risk of abnormal suspension of a normal service is reduced and the stability of the network operation is improved;

(4) the invention divides the network linked list searched out into sub-segments, establishes a search thread for each sub-segment, and perform a port search on multiple threads in parallel; therefore, the efficiency of the path search in a complicated network is greatly improved; and (5) the invention further provides the historical information of connection interruption and the occupancy rate information of a multiplex section resource on each path, for the convenience of a proper path selection for service transmission, so as to enhance the bearing capacity of a service network.

BRIEF DESCRIPTION OF THE DRAWINGS

FIG. 4 shows a flowchart of multi-thread searching in parallel in a specific implementation mode of the method according to the embodiment of the present invention; and FIG. 5 shows a flowchart of calculating a multiplex section occupied rate on a path in a specific implementation mode of the method according to the embodiment of the present invention.

DETAILED DESCRIPTION

Function Review

Considering the problem in the related art that a carrier cannot send a service to a destination along a false path searched out which is caused by a false connection establishment due to the different and complex connection rules of various single boards, an embodiment of the present invention provides a WDM network path search scheme, wherein the processing principle of this scheme is as follows: step A, searching out a network element linked list from a source network element of a service to a destination network element according to an inter-network element connection; step B, performing a port search on the network element linked list, performing a validity check on a found node, and ending the search when an invalid node is found; and step C, sorting out a path linked list of all possible paths according to path topology structure data searched out.

It should be noted that embodiments in this application and the features in the embodiments can be combined mutually if no conflict is caused. The present invention is illustrated below in detail in conjunction with the embodiments with reference to accompanying drawings.

In the embodiment below, the steps illustrated in the flowcharts shown in accompanying drawings can be carried out in a computer system in which a group of computer executable instructions are executed. Although a logical order of the steps is shown in the flowcharts, the illustrated or described steps may be carried out in a different order in some cases.

The embodiments of the present invention are further described below in detail in conjunction with specific implementations with reference to accompanying drawings.

Figure 1:
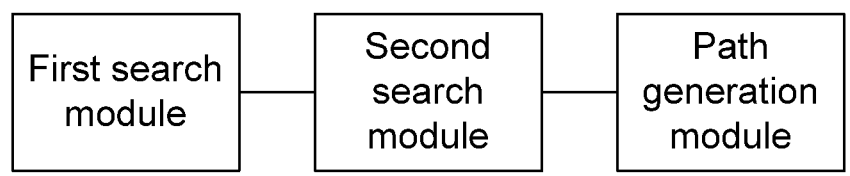
FIG. 1 shows a structural diagram of an implementation mode of a system according to an embodiment of the present invention.

One implementation mode of a WDM network path search system in an embodiment of the present invention is as follows: FIG. 1 shows a structural diagram of the implementation mode of the system according to the embodiment of the invention; as shown in FIG. 1, the system comprises a first search module, a second search module and a path generation module.

The first search module is configured to search out a network element linked list from a source network element of a service to a destination network element according to an inter-network element connection; the second search module is configured to perform a port search on the network element linked list, perform a validity check on a found node, and ending the search when an invalid node is found; the path generation module is configured to sort out a path linked list of all possible paths according to path topology structure data searched out.

The validity check on a node comprises checking whether each item of a wavelength, a wave band, a work/protection attribute, a branch-path number, a time slot and a service type is matched.

Figure 2:
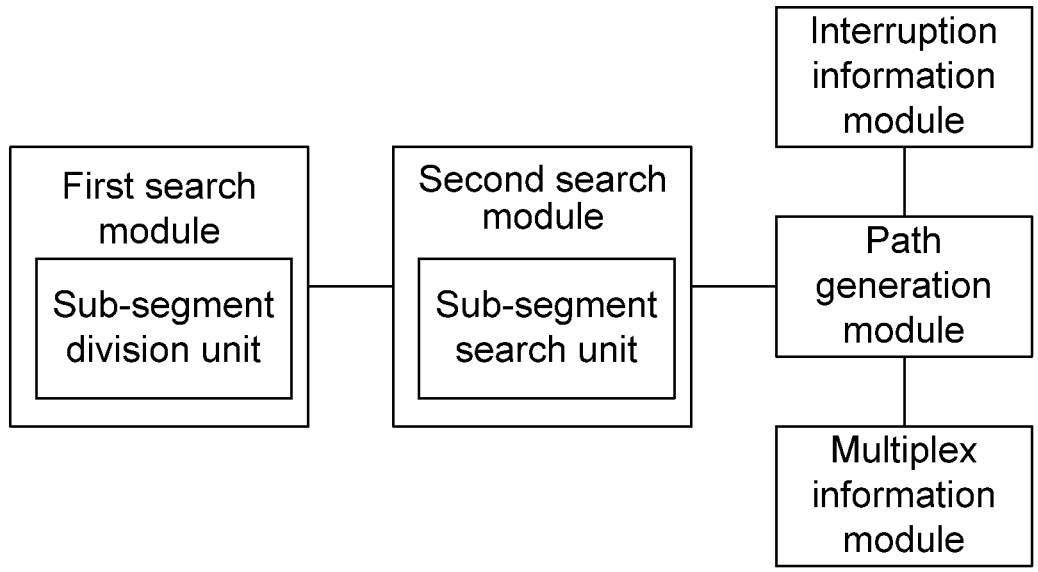
FIG. 2 shows a structural diagram of another implementation mode of the system according to the embodiment of the present invention.

The second search module is further configured to perform a conflict check between a found node and an established path, and end the search when a node having a conflict with the established path is found. FIG. 2 shows a structural diagram of another implementation mode of the system according to the embodiment of the present invention; as shown in FIG. 2, on the basis of the implementation mode above, the first search module may also comprise a sub-segment dividing unit configured to divide the network element linked list into a plurality of sub-segments according to a preset rule; the second search module may also comprise a sub-segment search unit configured to perform a port search on the plurality of sub-segments respectively.

The preset rule refers to that the network elements are adjacent and are of the same type.

The sub-segment search unit is further configured to generate a search thread for each sub-segment respectively, and perform a port search on search threads of all sub-segments in parallel.

The system according to the embodiment of the invention may also comprise an interruption information module configured to calculate historical interruption times of all connections on each path of all the possible paths and return a calculation result.

The system according to the embodiment of the invention may also comprise a multiplex information module configured to calculate resource occupancy rate of a multiplex section on each path of all the possible paths and return a calculation result.

A specific implementation mode of a WDM network path search method according to an embodiment of the present invention comprises the following steps:

step A, searching out a network element linked list from a source network element of a service to a destination network element according to an inter-network element connection;

step B, performing a port search on the network element linked list, performing a validity check on a found node, and ending the search when an invalid node is found; and step C, sorting out a path linked list of all possible paths according to path topology structure data searched out.

The validity check comprises checking whether each item of a wavelength, a wave band, a work/protection attribute, a branch-path number, a time slot and a service type is matched.

The step B further comprises performing a conflict check between a found node and an established path, and ending the search when a node having a conflict with the established path is found.

The step A further comprises dividing the network element linked list into a plurality of sub-segments according to a preset rule, and the step B further comprises performing a port search on the plurality of sub-segments respectively.

The preset rule refers to that the network elements are adjacent and are of the same type.

In the implementation mode, in the step B, a port search on the plurality of sub-segments respectively is performed by adopting a multi-thread method, that is, generating a search thread for each sub-segment respectively, and perform a port search on search threads of all sub-segments in parallel so as to improve search efficiency.

After the step C, the method further comprises calculating historical interruption times of all connections on each path of all the possible paths and returning a calculation result.

After the step C, the method further comprises calculating resource occupancy rate of a multiplex section on each path of all the possible paths obtained in the step C and returning a calculation result.

Figure 3:
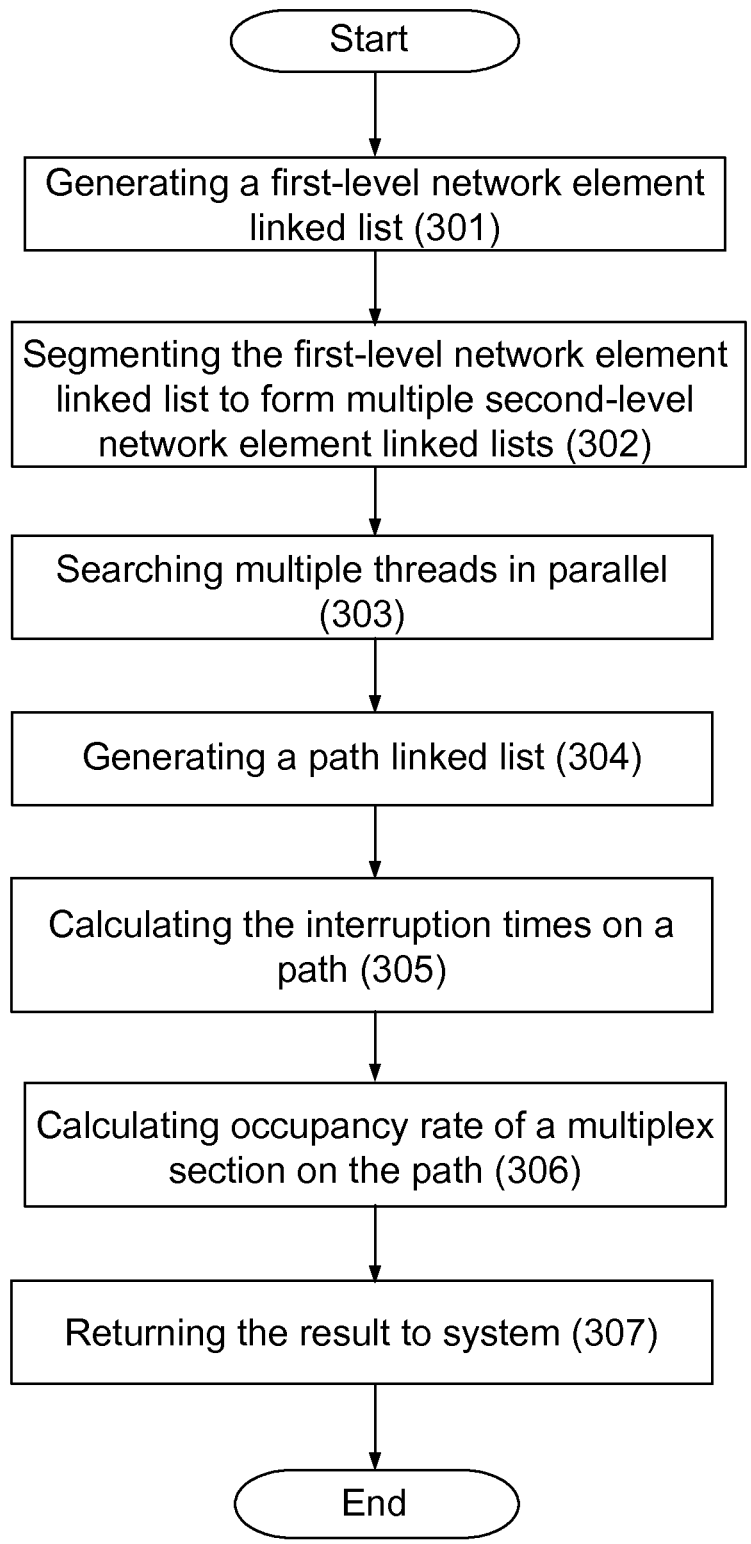
FIG. 3 shows a flowchart of a specific implementation mode of a method according to an embodiment of the present invention.

Another implementation mode of the embodiment of the present invention is provided below; FIG. 3 shows a flowchart of a specific implementation mode of the method according to the embodiment of the present invention; as shown in FIG. 3, the flow comprises the following steps:

step 301: searching out a network element-level connection between a source network element of a service and a destination network element according to an inter-network element connection to form a first-level network element linked list;

step 302: dividing the first-level network element linked list into multiple segments according to a rule, which is that network elements is adjacent and of the same type, to form multiple second-level network element linked lists; step 303: generating a search thread for each segment network elements; performing a sub-path search, which is a port search in detail, on multiple threads in parallel;

step 304: sorting out a path linked list of all possible paths according to path topology structure data searched out;

step 305: calculating historical interruption times of all connections on each path;

step 306: calculating a resource occupancy rate of a multiplex section on each path; and step 307: returning all the possible paths searched out, interruption information and resource occupancy rate of a multiplex section.

Wherein the step 303 describes the process of multi-thread executions in parallel being detailed to a port sub-path search, FIG. 4 shows a flowchart of multi-thread searching in parallel in a specific implementation mode of the method according to the embodiment of the present invention; as shown in FIG. 4, the flow comprises the following steps:

step 401: generating a search thread for each second-level network element linked list, executing step 402 to each thread in parallel, wherein the first input port of a sub-path is the source port of the sub-path; the last output port of the sub-path is the destination port of the sub-path;

step 402: taking the first port from the current port linked list;

step 403: determining whether the current port is an end port, if not, turning to step 404; if yes, turning to step 415;

step 404: determining whether the circulation of recursively computing a next node linked list for a port in the current port linked list is ended, if not, turning to step 405; if yes, turning to step 415;

step 405: determining a port direction, if the port is a receiving port, turning to step 406; otherwise, turning to step 407;

step 406: calculating whether the port has a conflict with a currently established path according to the opposite-end port rule of a current single board and finally obtaining all possible next nodes, then turning to step 410;

step 407: determining whether the port is a transmitting port, if not, turning to step 408, if yes, turning to step 409;

step 408: when the current port direction is bidirectional or any, determining whether the current port and a forward port in a path topology structure belong to the same single board, if yes, indicating that the port is in a transmitting state at present, then turning to step 409, otherwise, indicating that the port is in a receiving state at present, then turning to step 406;

step 409: obtaining node information of a port at the other connection end according to an optical connection or cross connection of the current port and calculating whether the node has a conflict with the currently established path;

step 410: taking the first node from a following node linked list;

step 411: determining the validity of the node, the validity determination comprising determining whether a wavelength, a wave band, a work/protection attribute, a branch-path number, a time slot and a service type information is consistent with that of the previous node, if not, indicating that this node is invalid, then turning to Step 413, if yes, indicating that this node is valid, then turning to step 412;

step 412: determining whether the port is an end port, if not, turning to step 404, if yes, turning to step 413;

step 413: determining whether all the nodes have been taken, if not, turning to step 414; if yes, turning to step 404;

step 414: taking a next node and turning to step 411;

step 415: determining whether all the ports have been taken, if not, turning to step 416, if yes, ending the flow;

step 416: taking a next node and turning to step 403.

The step 306 describes the flow of calculating a multiplex section resource occupied rate on a path, FIG. 5 shows a flowchart of calculating a multiplex section occupied rate on a path in a specific implementation mode of the method according to the embodiment of the present invention; as shown in FIG. 5, the flow comprises the following steps:

step 501: searching out a multiplex section in a path, traversing all the ports of the path, making a record from the last output port of an optical multiplex section layer (OMS) terminal type, that is, from the source port of a multiplex section resource, until the first input port of the OMS terminal type, wherein the recorded sequential port linked lists are a multiplex section of the path.

step 502: calculating the total bandwidth of the multiplex section and obtaining a source single board of the multiplex section; if the source single board is a non-concatenated board, obtaining the bandwidth directly from single board attributes; if the source single board is a concatenated board, tracing forwards from this single board along the inverse direction of the connection, accumulating the bandwidths of single boards of the same type until a single board of a different type appears, wherein the accumulated value is the total bandwidth of the multiplex section and is recorded as Band;

step 503: according to an inter-single board connection and a single-board opposite-end port rule, tracing forwards along the source port of the multiplex section until a service terminal single board is found; finally obtaining the number of service terminal boards communicated with the source port of the multiplex section, inquiring about the central frequencies/wavelengths of these terminal boards, calculating the number of different wavelengths and recording the number as Occupied which expresses the number of occupied channels in the multiplex section;

step 504: calculating the number of all the services passing through the multiplex section and recording the number as Used; since some connections bear no service, the connections passing through the multiplex section but actually bearing no services will cause redundancies and the redundancies can prompt users that there are enough network resources to be used at present;

step 505: calculating the occupancy rate of the multiplex section: O=Occupied×100%/Band, and redundancy rate R=(Occupied-Used)×100%/Band;

step 506: returning the path, the occupancy rate of multiplex section and redundancy rate of the multiplex section.

Obviously, those skilled in the art should understand that the modules and steps described above can be implemented by a common computer device; the modules or steps can be integrated into a single computing device or distributed on a network composed of a plurality of computing devices; optionally, the modules or steps can be implemented by programming codes executable by a computing device, thus they can be stored in a storage device to be executed by a computing device, or manufactured into individual integrated circuit module respectively, or several of them can be manufactured into a single integrated circuit module to be implemented; in this way, the present invention is not limited to any combination of specific hardware and software.

The above is the further detailed description of the present invention in conjunction with specific preferable implementation modes; it should not be considered that the specific implementation of the present invention is limited to the description above. For those skilled in the art, simple deductions or substitutes made without departing from the concept of the present invention should be deemed to be included within the protection scope of the present invention.

The invention claimed is:

1. A wavelength division multiplexing (WDM) network path search method, comprising:
   A. searching out a network element linked list from a source network element of a service to a destination network element according to an inter-network element connection;
   B. performing a port search on the network element linked list to search for nodes, performing a validity check on a found node, and ending the search when an invalid node is found; and
   C. sorting out a path linked list of all possible paths according to a path topology structure data searched out;
   wherein, the validity check on the found node is performed by checking whether each item of a wavelength, a wave band, a work/protection attribute, a branch-path number, a time slot and a service type is matched.

2. The method according to claim 1, wherein the step B further comprises performing a conflict check between the found node and an established path, and ending the search when the found node having a conflict with the established path is found.

3. The method according to claim 2, further comprising: after the step C, calculating historical interruption times of all connections on each path of all the possible paths obtained in the step C and returning a calculation result.

4. The method according to claim 2, further comprising: after the step C, calculating a resource occupancy rate of a multiplex section on each path of all the possible paths obtained in the step C and returning a calculation result.

5. The method according to claim 2, wherein the step A further comprises dividing the network element linked list into a plurality of sub-segments according to a preset rule; and the step B further comprises performing the port search on the plurality of sub-segments respectively.

6. The method according to claim 5, wherein in the step B, the port search on the plurality of sub-segments respectively is performed by generating a search thread for each sub-segment respectively and performing the port search on search threads of all sub-segments in parallel.

7. The method according to claim 1, wherein the step A further comprises dividing the network element linked list into a plurality of sub-segments according to a preset rule; and the step B further comprises performing the port search on the plurality of sub-segments respectively.

8. The method according to claim 7, wherein in the step B, the port search on the plurality of sub-segments respectively is performed by generating a search thread for each sub-segment respectively and performing the port search on search threads of all sub-segments in parallel.

9. The method according to claim 1, further comprising: after the step C, calculating historical interruption times of all connections on each path of all the possible paths obtained in the step C and returning a calculation result.

10. The method according to claim 1, further comprising: after the step C, calculating a resource occupancy rate of a multiplex section on each path of all the possible paths obtained in the step C and returning a calculation result.

11. A wavelength division multiplexing (WDM) network path search system, comprising a first search module, a second search module and a path generation module;
    the first search module configured to search out a network element linked list from a source network element of a service to a destination network element according to an inter-network element connection;
    the second search module configured to perform a port search on the network element linked list to search for nodes, perform a validity check on a found node, and end the search when an invalid node is found; and
    the path generation module configured to sort out a path linked list of all possible paths according to a path topology structure data searched out;
    wherein, the validity check on the found node comprises checking whether each item of a wavelength, a wave band, a work/protection attribute, a branch-path number, a time slot and a service type is matched.

12. The system according to claim 11, wherein the second search module is further configured to perform a conflict check between the found node and an established path, and end the search when the found node having a conflict with the established path is found.

13. The system according to claim 12, wherein the first search module comprises a sub-segment dividing unit configured to divide the network element linked list into a plurality of sub-segments according to a preset rule; and the second search module comprises a sub-segment search unit configured to perform the port search on the plurality of sub-segments respectively.

14. The system according to claim 13, wherein the sub-segment search unit is further configured to generate a search thread for each sub-segment respectively and perform the port search on search threads of all sub-segments in parallel.

15. The system according to claim 11, wherein the first search module comprises a sub-segment dividing unit configured to divide the network element linked list into a plurality of sub-segments according to a preset rule; and the second search module comprises a sub-segment search unit configured to perform the port search on the plurality of sub-segments respectively.

16. The system according to claim 15, wherein the sub-segment search unit is further configured to generate a search thread for each sub-segment respectively and perform the port search on search threads of all sub-segments in parallel.

* * * * *